United States Patent
Taniguchi

(10) Patent No.: US 10,030,707 B2
(45) Date of Patent: Jul. 24, 2018

(54) ROLLING BEARING

(71) Applicant: JTEKT CORPORATION, Osaka-shi, Osaka (JP)

(72) Inventor: Youzou Taniguchi, Toyota (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/478,754

(22) Filed: Apr. 4, 2017

(65) Prior Publication Data

US 2017/0292567 A1    Oct. 12, 2017

(30) Foreign Application Priority Data

Apr. 11, 2016  (JP) .................................. 2016-078916

(51) Int. Cl.
*F16C 33/38*    (2006.01)

(52) U.S. Cl.
CPC .......... *F16C 33/3875* (2013.01); *F16C 33/38* (2013.01); *F16C 2226/70* (2013.01)

(58) Field of Classification Search
CPC .. F16C 33/38; F16C 33/3806; F16C 33/3875; F16C 33/3887; F16C 2226/70; F16C 2226/74; F16C 2226/76; F16C 2226/78
See application file for complete search history.

(56) References Cited

FOREIGN PATENT DOCUMENTS

JP    2009-168110 A      7/2009
JP    2013096434 A  *   5/2013   .......... F16C 33/3875

OTHER PUBLICATIONS

Machine Translation of JP 2013-096434 dated May 2013.*

* cited by examiner

*Primary Examiner* — Alan B Waits
(74) *Attorney, Agent, or Firm* — Oliff PLC

(57) ABSTRACT

A rolling bearing includes a cage formed by coupling a first and a second division pieces into which the cage is divided in an axial direction. At least the first division piece is provided with a protruding portion extending in an axial direction toward the second division piece and having a locking portion formed at a tip of the protruding portion with the locking portion protruding toward a radially outer side. The second division piece is provided with a locked recessed portion in which the locking portion is locked. On an inner peripheral surface of the first division piece, an avoiding recessed portion is formed which allows avoidance of interference of the inner peripheral surface of the first division piece with an inner ring when the first division piece is tilted toward a radially inner side in order to lock the locking portion in the locked recessed portion.

4 Claims, 9 Drawing Sheets

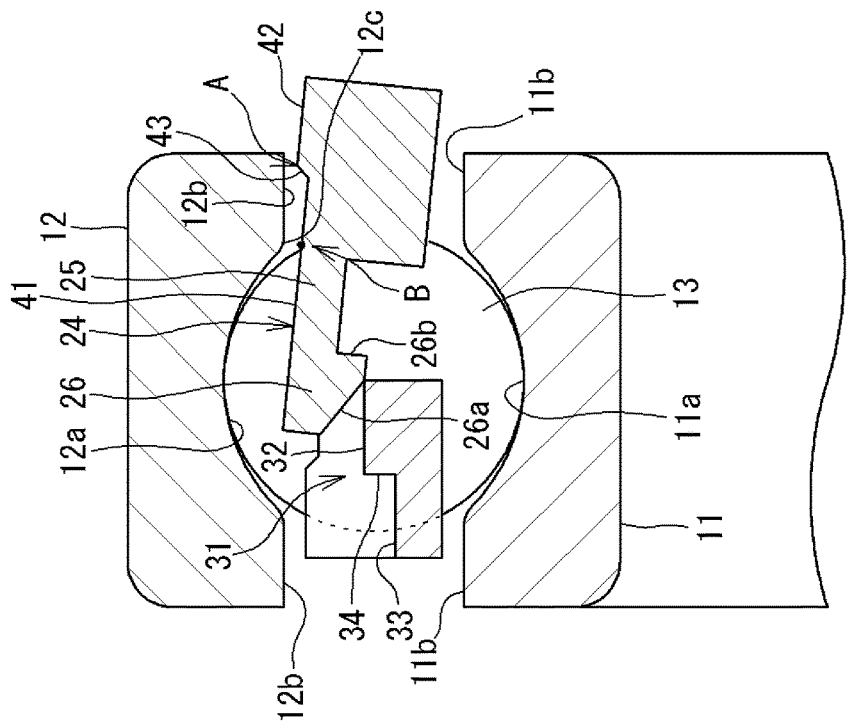
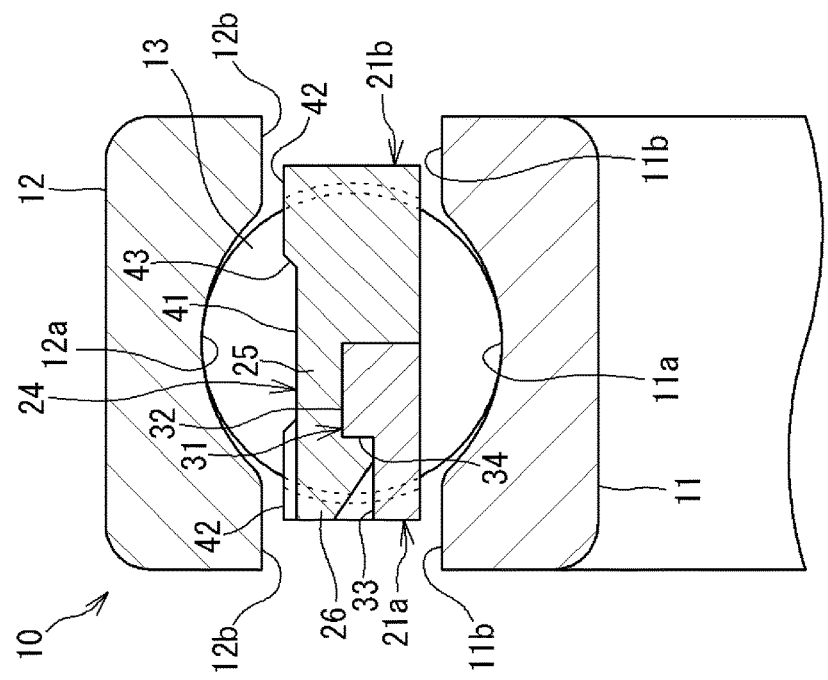

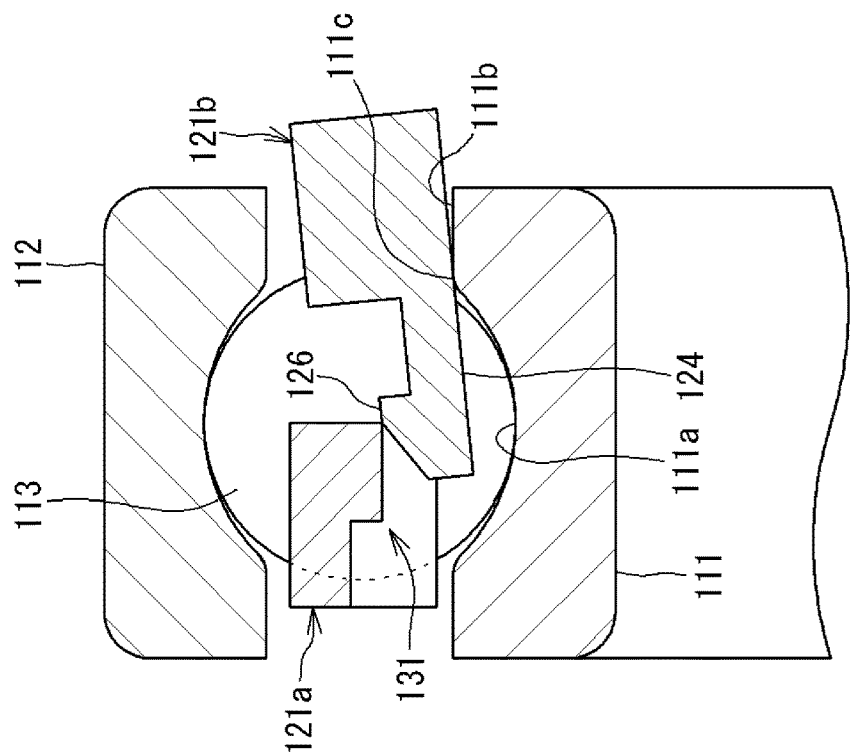
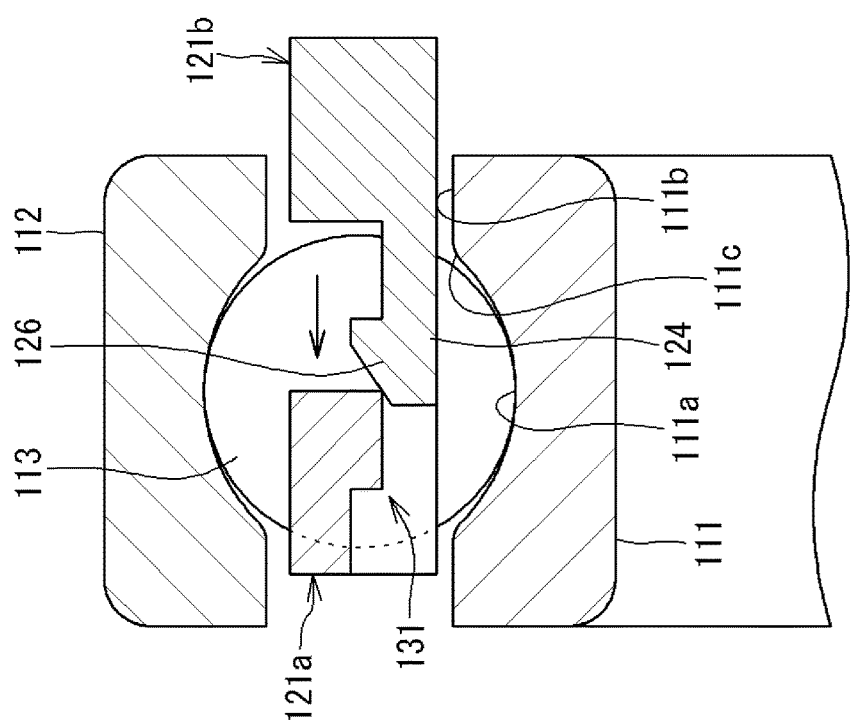

ROLLING BEARING

INCORPORATION BY REFERENCE

The disclosure of Japanese Patent Application No. 2016-078916 filed on Apr. 11, 2016 including the specification, drawings and abstract, is incorporated herein by reference in its entirety.

BACKGROUND OF THE INVENTION

1. Field of the Invention

The invention relates to a rolling bearing including a two-piece cage.

2. Description of the Related Art

As a cage that holds rolling elements provided between an inner ring and an outer ring of a roller bearing, what is called a fully-encasing cage is known (see, for example, Japanese Patent Application Publication No. 2009-168110 (JP 2009-168110 A). For example, as depicted in FIG. 7 and FIG. 8, a fully-encasing cage 114 has a pair of circular ring portions 115 and a plurality of cage bars 116 connecting the circular ring portions 115 together. Pockets 117 that hold respective rolling elements 113 each correspond to a space between the circular ring portions 115 and between a pair of the cage bars 116 adjacent to each other in a circumferential direction.

The cage 114 depicted in FIG. 8 is a two-piece cage formed by coupling a pair of division pieces 121a, 121b shaped like circular rings. The division piece 121a has one of the circular ring portions 115 and division cage bars 122a extending in an axial direction from the circular ring portion 115. The division piece 121b has the other of the circular ring portions 115 and division cage bars 122b extending in the axial direction from the circular ring portion 115. Each of the division cage bars 122a is coupled to the corresponding opposite division cage bar 122b to form the corresponding cage bar 116. The division cage bars 122a, 122b are coupled together by locking a protruding portion 124 formed on each of the division pieces 121a, 121b in a locked recess portion 131 formed in the mating division piece 121b, 121a.

The division pieces of the two-piece cage depicted in FIG. 7 and FIG. 8 are assembled into a rolling bearing through a process illustrated in FIGS. 9A and 9B. As depicted in FIG. 9A, with the first division piece 121a inserted between an inner ring 111 and an outer ring 112, the second division piece 121b is moved closer in the axial direction to the first division piece 121a to engage the protruding portion 124 with the locked recess portion 131. At this time, as depicted in FIG. 9B, the second division piece 121b is tilted inward in a radial direction so as to allow a locking portion 126 formed at a tip of the protruding portion 124 to pass through a radially inner side with respect to the first division piece 121a.

However, when the second division piece 121b is tilted as described above, an inner peripheral surface of the second division piece 121b may interfere with a boundary 111c between a raceway 111a and a shoulder portion 111b of the inner ring 111 to damage the division piece 121b. A portion of the second division piece 121b that interferes with the boundary 111c is located close to the elongated protruding portion 124, thus reducing the strength of the protruding portion 124. This is not preferable.

SUMMARY OF THE INVENTION

An object of the invention is to provide a rolling bearing that allows prevention of interference of a two-piece cage with a bearing ring when the two-piece cage is assembled into the rolling bearing.

A rolling bearing in an aspect of the invention includes a pair of bearing rings arranged so as to face each other in a radial direction, a plurality of rolling elements interposed between the bearing rings, and a cage having a pair of circular ring portions and a plurality of cage bars connecting the circular ring portions together, the cage having pockets each formed between the circular ring portions and between the cage bars adjacent to each other in a circumferential direction so as to house the corresponding rolling element. The cage is formed by coupling a pair of a first and a second division pieces into which the cage is divided in an axial direction. At least the first division piece is provided with a protruding portion extending in the axial direction of the rolling bearing toward the second division piece and having a locking portion formed at a tip of the protruding portion with the locking portion protruding toward one of a radially inner side and a radially outer side. The second division piece is provided with a locked recessed portion in which the locking portion is locked. On a peripheral surface of the first division piece that is located on the other of the radially inner side and the radially outer side, an avoiding recessed portion is formed which allows avoidance of interference of the peripheral surface of the first division piece with the bearing ring arranged on the other of the radially inner side and the radially outer side when the first division piece is tilted toward the other of the radially inner side and the radially outer side in order to lock the locking portion in the locked recessed portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 6A and 6B are sectional views of a rolling bearing according to a second embodiment;

FIGS. 9A and 9B are sectional views of the rolling bearing according to the related art illustrating a process of coupling a pair of division pieces of the cage together.

DETAILED DESCRIPTION OF EMBODIMENTS

Figure 1:
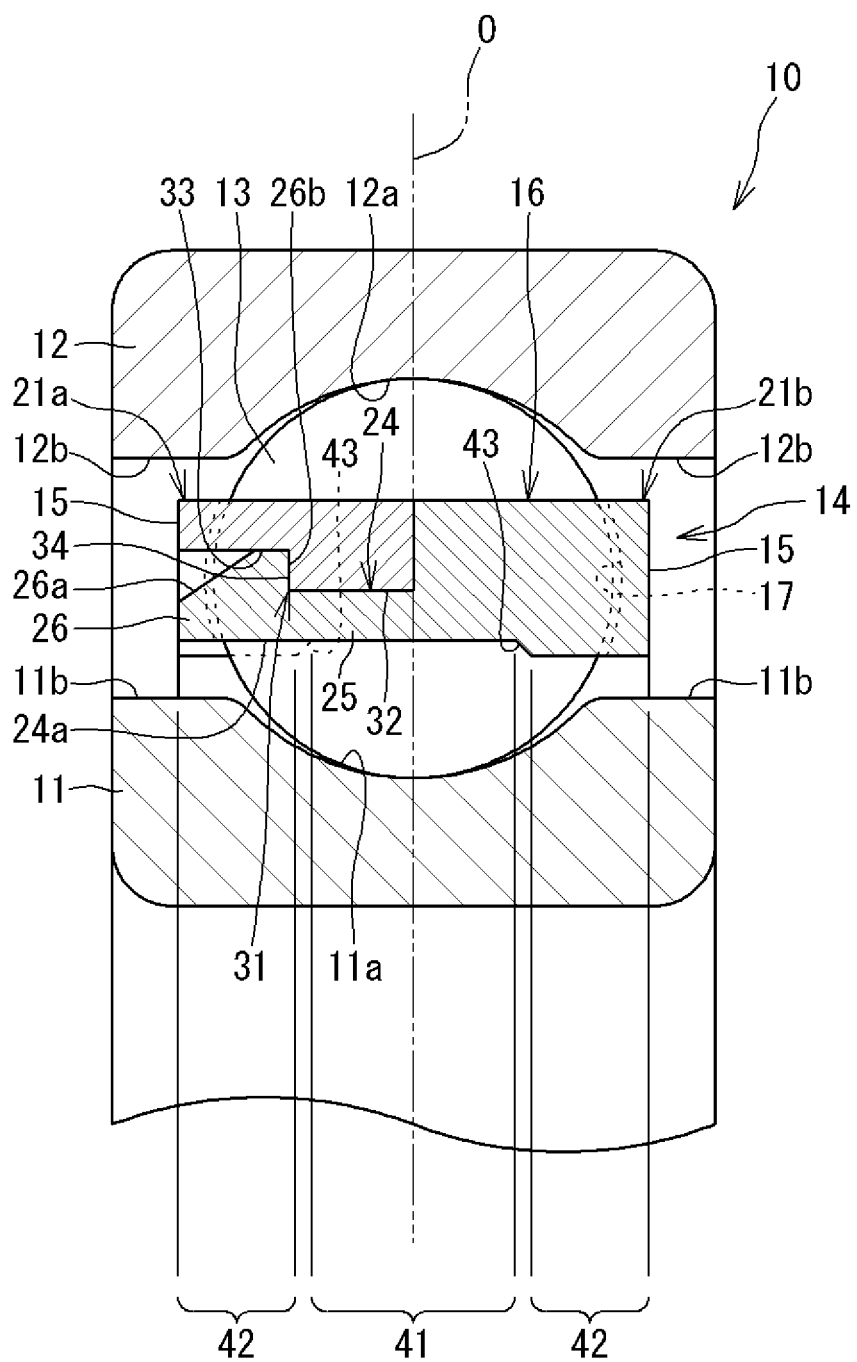
FIG. 1 is a sectional view of a rolling bearing according to a first embodiment.

An embodiment of the invention will be described below based on the drawings. FIG. 1 is a sectional view of a rolling bearing according to the embodiment. A rolling bearing 10 includes an inner ring 11, an outer ring 12, a plurality of rolling elements 13, and a cage 14. The rolling elements 13 are interposed between the inner ring 11 and the outer ring 12. The cage 14 holds the rolling elements 13. The rolling elements 13 in the present embodiment are balls, and the rolling bearing 10 is a deep groove ball bearing. In the description below, a side closer to a center O in an axial direction may be hereinafter referred to as an axially inner side, and a side farther from the center O in the axial direction may be hereinafter referred to as an axially outer side.

A raceway 11a along which the balls 13 roll is formed on an outer peripheral surface of the inner ring 11. The raceway 11a has a section shaped generally like a recessed circular arc. Shoulder portions 11b are formed at opposite sides of the raceway 11a in the axial direction. A raceway 12a along which the balls 13 roll is formed on an inner peripheral surface of the outer ring 12. The raceway 12a has a section shaped generally like a recessed circular arc. Shoulder portions 12b are formed at opposite sides of the raceway 12a in the axial direction.

Figure 2:
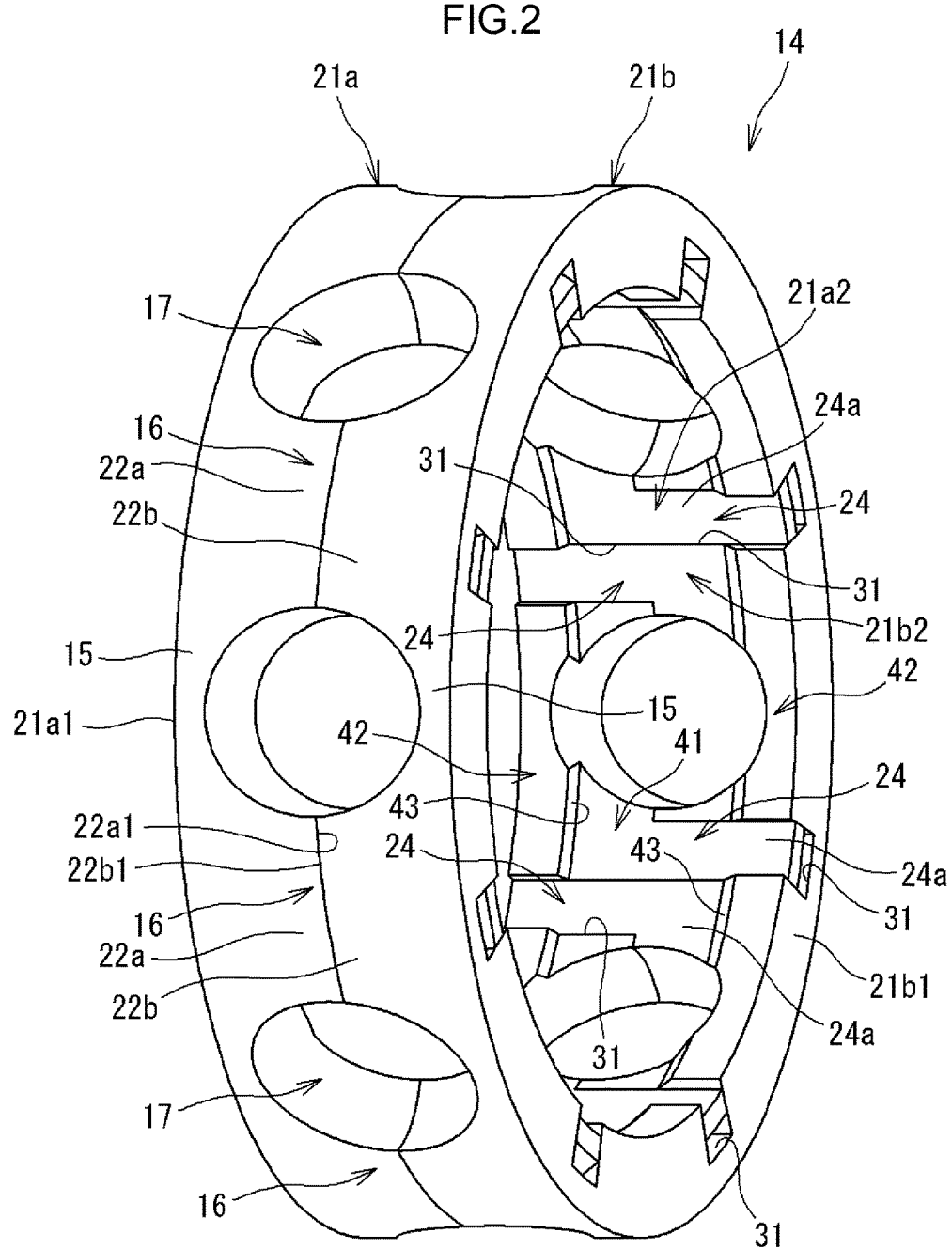
FIG. 2 is a perspective view depicting a cage of the rolling bearing.

FIG. 2 is a perspective view depicting the cage 14 of the rolling bearing 10. As depicted in FIG. 1 and FIG. 2, the cage 14 has a pair of circular ring portions 15 and a plurality of cage bars 16. The circular ring portions 15 are positioned at opposite sides of the balls 13 in the axial direction. The cage bars 16 connect the circular ring portions 15 together. Pockets 17 that hold the respective balls 13 each correspond to a space between the circular ring portions 15 and between the cage bars 16 adjacent to each other in a circumferential direction. The cage 14 is of a fully-encasing type that holds the balls 13 at the opposite sides thereof in the axial direction. Each of the pockets 17 is shaped like a circle as viewed in a radial direction. An inner surface of the pocket 17 is shaped like a recessed curved surface extending along a surface of a sphere having a radius slightly larger than the radius of each ball 13 at an outer peripheral surface thereof. Thus, a slight clearance is formed between the pocket 17 and the outer peripheral surface of the ball 13. The pocket 17 may be shaped like a quadrangle as viewed in the radial direction such that the ball 13 can come into contact with each of the four sides of the pocket 17.

The cage 14 includes a pair of a first and a second division pieces 21a, 21b into which the cage 14 is divided in the axial direction. In other words, the single cage 14 is formed by coupling the division pieces 21a, 21b together. The division pieces 21a, 21b are made of resin and formed by injection molding. The division piece 21a has one of the circular ring portions 15 and division cage bars 22a. The division piece 21b has the other of the circular ring portions 15 and division cage bars 22b. The division case bars 22a, 22b extend from the corresponding circular ring portions 15, 15 toward the mating division pieces 21b, 21a, respectively. Each of the division cage bars 22a, 22b forms approximately a half of the corresponding cage bar 16. The division pieces 21a, 21b are formed to have the same shape. The cage 14 is formed by placing the division pieces 21a, 21b so as to be mutually inverted and bringing the division cage bars 22a, 22b into abutting contact with each other to couple the division cage bars 22a, 22b together.

Figure 3:
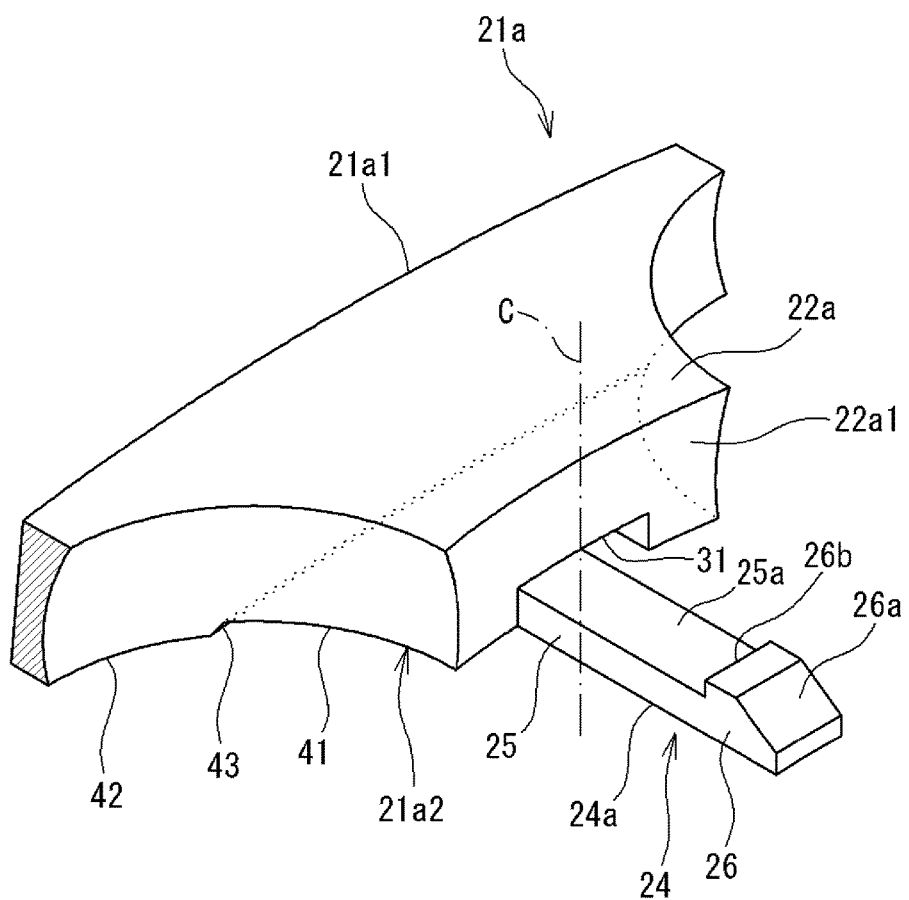
FIG. 3 is a perspective view depicting a part of a division piece of the cage.
Figure 4:
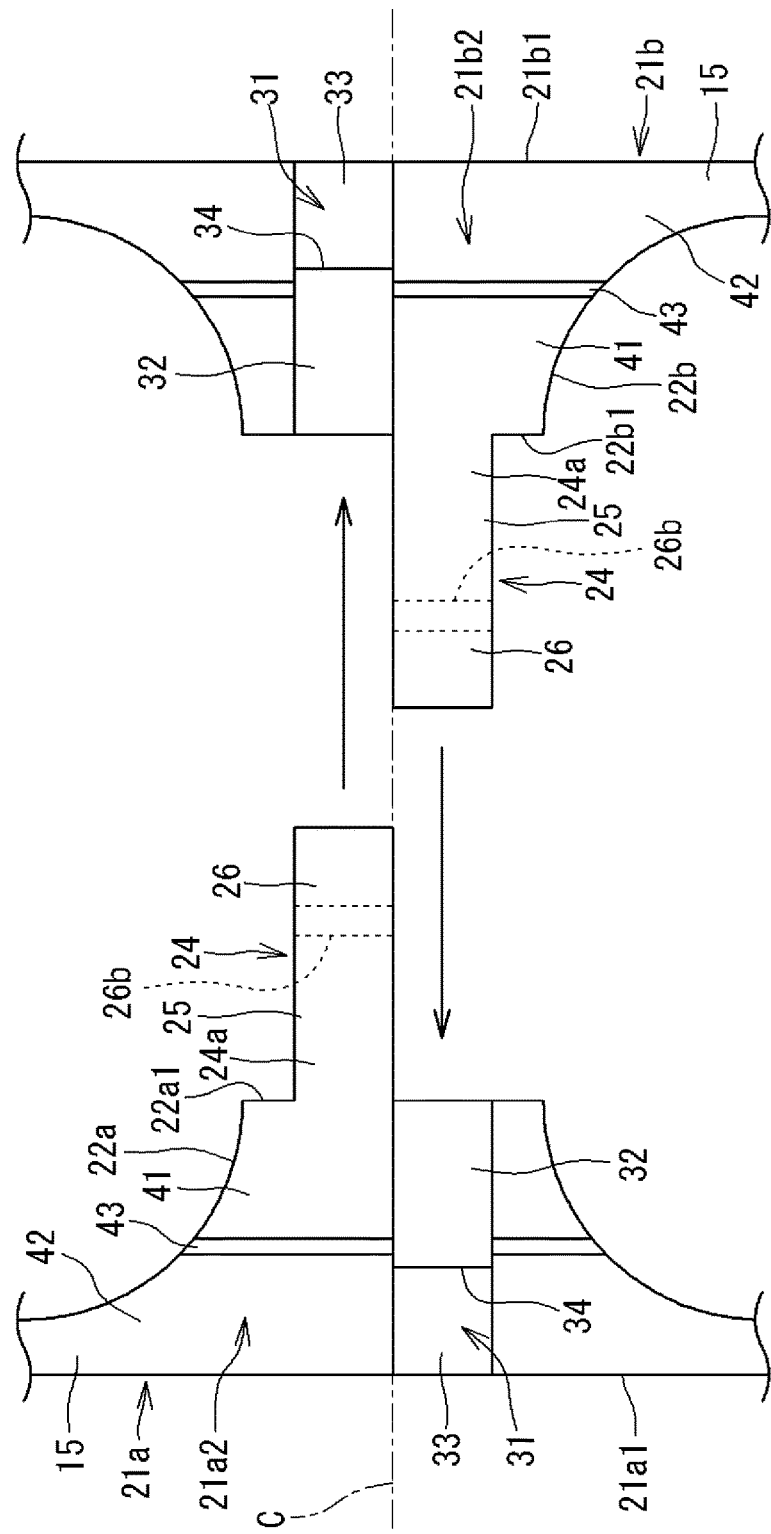
FIG. 4 is a diagram of a disassembled pair of division pieces as viewed from a radially inner side.

FIG. 3 is a perspective view depicting a part of the first division piece 21a of the cage 14. FIG. 4 depicts a part of the disassembled division pieces as viewed from a radially inner side. The second division piece 21b has exactly the same structure as that of the first division piece 21a depicted in FIG. 3 except that the second division piece 21b has the opposite orientation in the axial direction. As depicted in FIGS. 2 to 4, on tip surfaces 22a1, 22b1 of the division cage bars 22a, 22b of the division pieces 21a, 21b, protruding portions 24 are provided which extend toward the mating division pieces 21b, 21a, respectively. The protruding portions 24 are provided on radially inner sides of the tip surfaces 22a1, 22b1 of the division cage bars 22a, 22b such that each protruding portion 24 lies at either side with respect to a center C in the circumferential direction. The protruding portions 24 of the division pieces 21a, 21b reach the axially outer end surfaces 21b1, 21a1 of the mating division pieces 21b, 21a, respectively (see FIG. 2). A radially inner side surface 24a of each of the protruding portions 24 forms a part of an inner peripheral surface 21a2, 21b2 of the corresponding division piece 21a, 21b.

Each protruding portion 24 has a main body portion 25 formed generally like a rod and a locking portion 26 provided at a tip portion of the main body portion 25. The main body portion 25 is shaped like a quadrangular prism with a generally quadrangular section. The locking portion 26 has substantially the same circumferential width as that of the main body portion 25 and has a larger radial height than the main body portion 25.

The locking portion 26 is flush with a radially inner surface of the main body portion 25 and protrudes radially outward of a radially outer surface 25a of the main body portion 25. The radially outer surface 26a of the locking portion 26 is formed as an inclined surface having a radial height decreasing toward a tip side of the protruding portion 24. An axially inner side surface 26b of the locking portion 26, that is, a step surface 26b between the locking portion 26 and the main body portion 25, serves as a locking surface that engages with a locking groove described below.

Locking grooves (locked recessed portions) 31 that axially extend are formed in the inner peripheral surfaces of the division pieces 21a, 21b. The locking grooves 31 are open in tip surfaces 22a1, 22b1 (axially inner end surfaces) of the division cage bars 22a, 22b and in axially outer end surfaces 21a1, 21b1 of the division pieces 21a, 21b. The locking groove 31 of the division cage bar 22a is located opposite to the corresponding protruding portion 24 with respect to the center C of the tip surfaces 22a1 in the circumferential direction. The locking groove 31 of the division cage bar 22b is located opposite to the corresponding protruding portion 24 with respect to the center C of the tip surfaces 22b1 in the circumferential direction. In the present embodiment, each protruding portion 24 is located adjacent to the corresponding locking groove 31 across the center C in the circumferential direction.

As depicted in FIG. 1, each of the locking grooves 31 includes a shallow groove portion 32 arranged on an axially inner side of the cage 14 and a deep groove portion 33 arranged on an axially outer side of the cage 14. The main body portion 25 of the protruding portion 24 is inserted into the shallow groove portion 32, and the locking portion 26 is inserted into the deep groove portion 33. The shallow groove portion 32 has a circumferential groove width and a radial groove depth that are substantially the same as or slightly larger than a circumferential width and a radial height of the main body portion 25, respectively. The shallow groove portion 32 has substantially the same axial length as that of the main body portion 25.

The deep groove portion 33 has the same groove width as that of the shallow groove portion 32 and is formed deeper than the shallow groove portion 32. The deep groove portion 33 is formed to have a groove width and a groove depth that are substantially the same as or slightly larger than a width and a height of the locking portion 26, respectively. The deep groove portion 33 has substantially the same axial length as that of the locking portion 26.

Therefore, when inserted into the locking groove 31, the protruding portion 24 is housed inside the locking groove 31. In this state, the locking surface 26b of the locking portion 26 comes into abutting contact with the step surface 34 between the shallow groove portion 32 and the deep groove portion 33, with the locking portion 26 locked in the locking groove 31. Consequently, the division pieces 21a, 21b are coupled together without being separated from each other in the axial direction.

As depicted in FIGS. 1 to 4, an inner peripheral surface of the cage 14 includes recessed areas 41 that are recessed in the radial direction and protruding areas 42 that protrude in the radial direction relative to the recessed areas 41. The recessed areas 41 are formed on an axially inner side of the cage 14. The protruding areas 42 are formed on an axially outer side of the cage 14. Step portions 43 are each formed between the corresponding recessed area 41 and the corresponding protruding area 42. The step portions 43 are formed along the circumferential direction.

Each of the protruding areas 42 is formed on an inner peripheral surface of the circular ring portion 15 and on an inner peripheral surface of an axially outer part of the cage bar 16. Each of the recessed areas 41 is formed between the axially opposite protruding areas 42 and on the inner peripheral surface of the cage bar 16. The entire inner peripheral surface 24a of each protruding portion 24 is substantially flush with the corresponding recessed area 41. Thus, a tip portion of the protruding portion 24 is recessed in the mating protruding area 42.

Each of the step portions 43 is formed as an inclined surface having a depth varying gradually from the corresponding protruding area 42 toward the corresponding recessed area 41. Thus, the section of each of the division pieces 21a, 21b varies gradually from the protruding area 42 toward the recessed area 41. The recessed area 41 in the present embodiment functions as an avoiding recessed portion intended to avoid interference of the cage 14 with the bearing ring (inner ring 11) when the cage 14 is assembled into the rolling bearing 10. The avoiding recessed portion will be specifically described below.

Figure 5A:
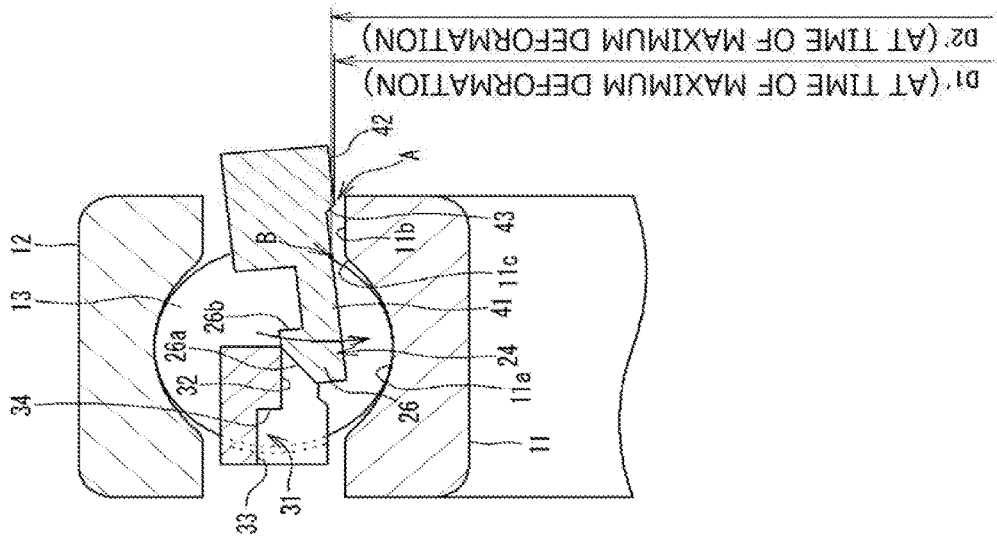
FIGS. 5A and 5B are sectional views of the rolling bearing illustrating a process of coupling the division pieces together.
Figure 5B:
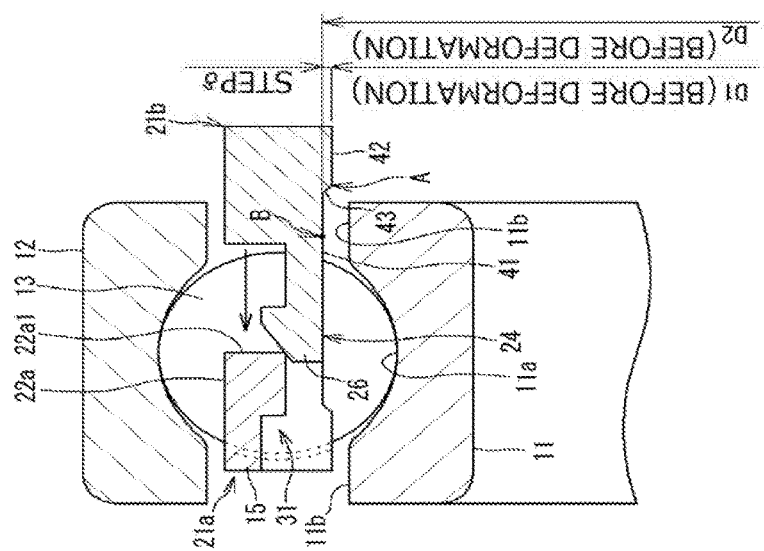
Figure 7:
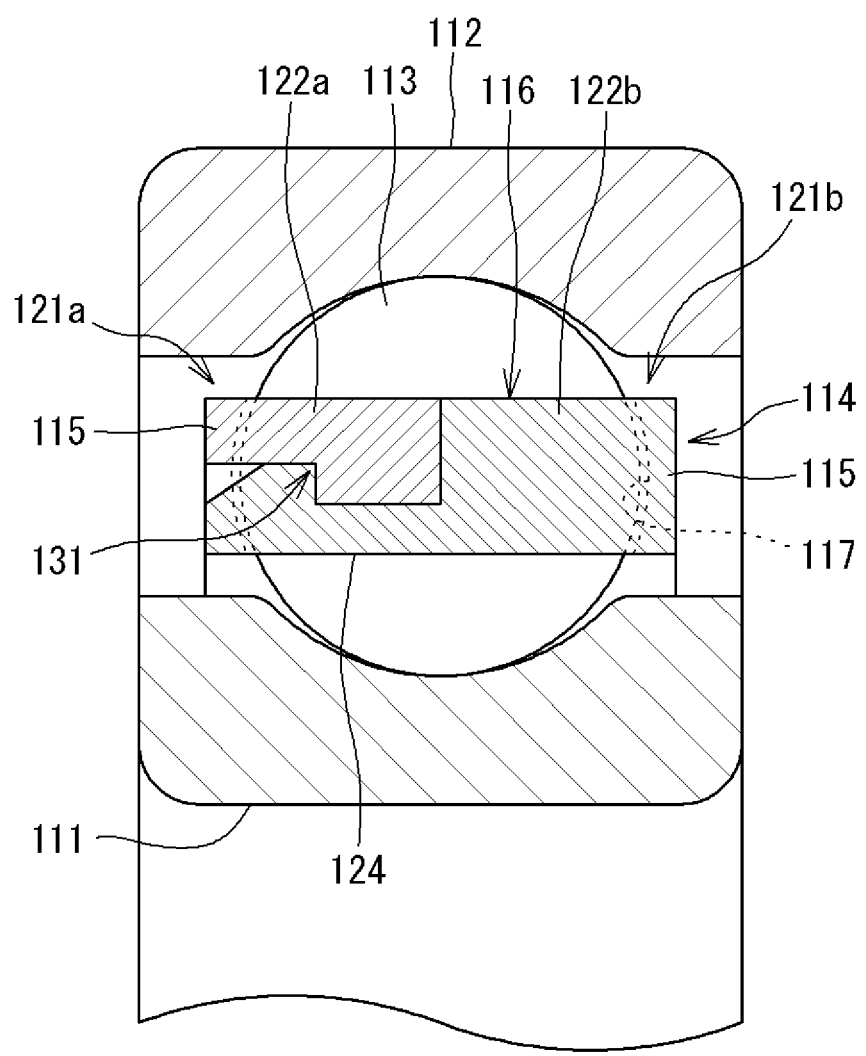
FIG. 7 is a sectional view depicting a rolling bearing according to a related art.
Figure 8:
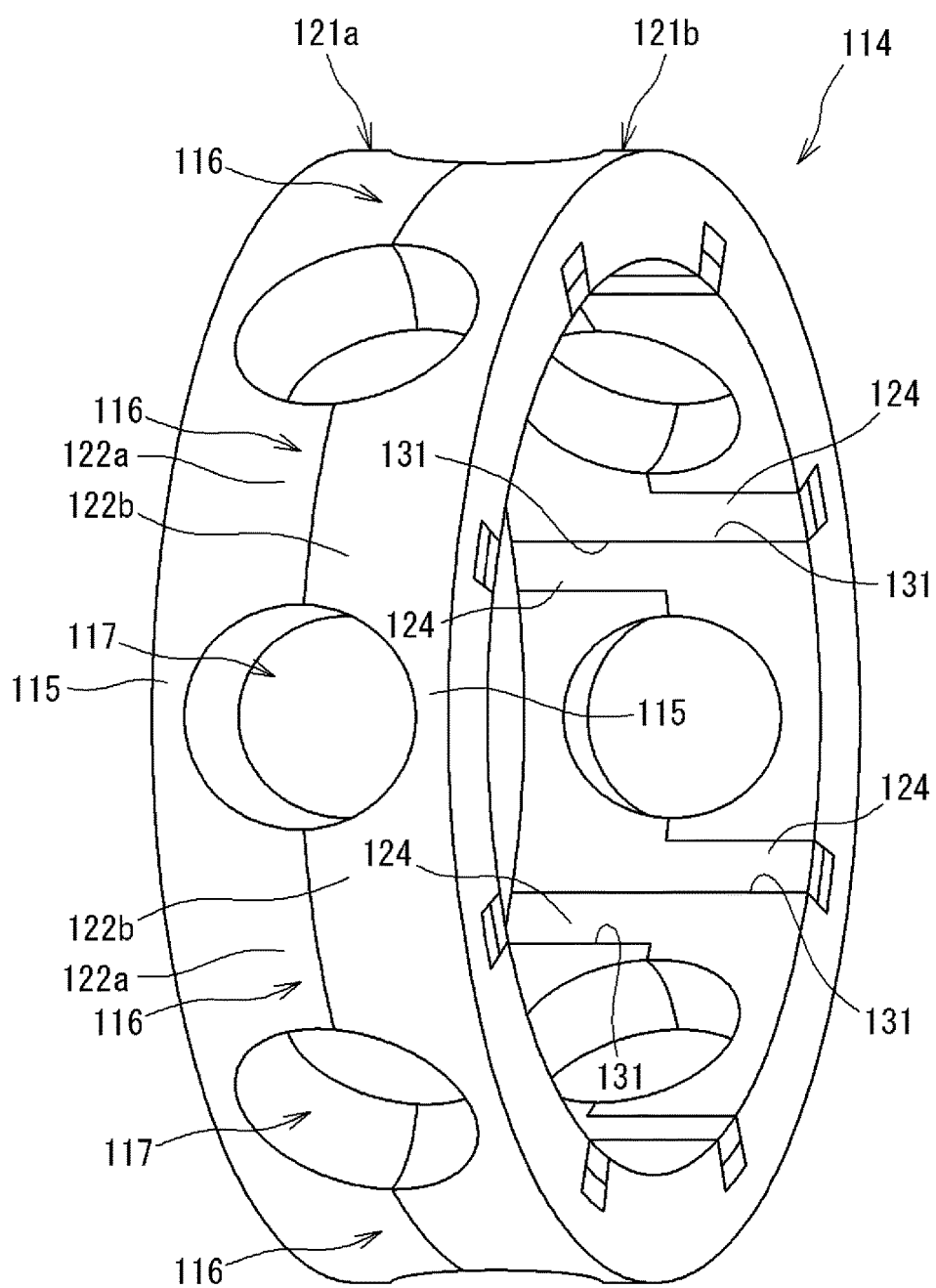
FIG. 8 is a perspective view depicting a cage of the rolling bearing according to the related art.

FIGS. 5A and 5B are sectional views of the rolling bearing illustrating a process of coupling the division pieces 21a, 21b together. The cage 14 is assembled into the rolling bearing 10 with the rolling elements 13 interposed between the inner ring 11 and the outer ring 12. First, as depicted in FIG. 5A, the first division piece 21a is inserted between the inner ring 11 and the outer ring 12, and the second division piece 21b is moved closer to the first division piece 21a in the axial direction. In this state, the locking portion 26 of each protruding portion 24 of the second division piece 21b interferes with the tip surface 22a1 of each division cage bar 22a of the first division piece 21a. Thus, as depicted in FIG. 5B, the protruding portion 24 side of the second division piece 21b is tilted by being elastically deformed inward in the radial direction such that each locking portion 26 is placed on the shallow groove portion 32 of the corresponding locking groove 31. In this state, the second division piece 21b is pushed into the first division piece 21a. Subsequently, the locking portion 26 shifts from the shallow groove portion 32 to the deep groove portion 33. The division piece 21b elastically returns to insert the locking portion 26 into the deep groove portion 33 to lock the locking portion 26 onto the step surface 34.

As depicted in FIG. 5B, when the division piece 21b is tilted, the inner peripheral surface of the division piece 21b is located closest to the boundary 11c between the raceway 11a and the shoulder portion 11b in the inner ring 11. In the related art, the inner peripheral surface of the division piece 121b may interfere with the boundary 111c of the inner ring 111 to damage the division piece 121b as depicted in FIG. 9B. In contrast, in the present embodiment, the recessed areas (avoiding recessed portions) 41 are formed on the inner peripheral surface of the division piece 21b, thus avoiding the interference of the inner peripheral surface of the division piece 21b with the boundary 11c. This prevents the strength of the protruding portions 24 from being reduced by the operation of assembling the cage 14 into the rolling bearing, allowing the division pieces 21a, 21b to be firmly coupled together. The recessed areas (avoiding recessed portions) 41 also function as oil sumps in which lubricant is stored and advantageously function to lubricate the raceway 11a.

Now, dimensional relations between the protruding area 42 and the recessed area 41 will be described. As depicted in FIG. 5A, before the second division piece 21b is tilted, a diameter D2 of the recessed area 41 is larger than a diameter D1 of the protruding area 42. A half δ of the difference between the diameters D1 and D2, that is, the difference δ between the radius of the recessed area 41 and the radius of the protruding area 42, is expressed as follows.

$$\delta = (D2 - D1)/2 \quad (1)$$

On the other hand, when the second division piece 21b is maximally tilted, that is, when the locking portion 26 of the protruding portion 24 is placed on the shallow groove portion 32 of the locking groove 31, the recessed area 41 has a diameter D2' at a position B where the recessed area 41 faces the boundary 11c and the protruding area 42 has a diameter D1' at a position A where the protruding area 42 has the smallest bore diameter, as expressed as follows.

$$D2' = D2 - 2\Delta B \quad (2)$$

$$D1' = D1 - 2\Delta A \quad (3)$$

The maximum radial deformation of the division piece 21b at the position A is denoted by ΔA. The maximum radial deformation of the division piece 21b at the position B is denoted by ΔB.

When a relation expressed by Expression (4) is satisfied by D1' and D2', the inner peripheral surface of the division piece 21b can be prevented from interfering with the boundary 11c of the inner ring 11.

$$D2' > D1' \quad (4)$$

A relation expressed by Expression (5) can be obtained using Expressions (1) to (4) described above.

$$\delta > \Delta B - \Delta A \quad (5)$$

Therefore, if the following are set such that the maximum radial deformation ΔA at the position A and the maximum radial deformation ΔB at the position B satisfy the relation expressed by Expression (5): the axial widths of the recessed area 41 and the protruding area 42, the magnitude of the difference δ between the radii of the recessed area 41 and the protruding area 42, the height of the locking portion 26, and the like, then the second division piece 21b can be coupled to the first division piece 21a without interference with the inner ring 2. In the first division piece 21a, the recessed area 41 and the protruding area 42 have a similar relation.

The axial widths of the protruding area 42 and the recessed area 41 may be set such that immediately after the locking portion 26 is placed on the shallow groove portion 32 of the locking groove 31, the step portion 43, which is the boundary between the recessed area 41 and the protruding area 42, is positioned outward of the shoulder portion 11b in the radial direction as depicted in FIG. 5B.

FIGS. 6A and 6B are sectional views of the rolling bearing 10 according to a second embodiment. In the present embodiment, the protruding portions 24 and the locking grooves 31 are formed on radially outer sides of the division pieces 21a, 21b. On outer peripheral surfaces of the division pieces 21a, 21b, the protruding areas 42 and the recessed areas (avoiding recessed portions) 41 are formed. Therefore, in the present embodiment, when the second division piece 21b is coupled to the first division piece 21a, the protruding portion 24 side of the second division piece 21b is tilted outward in the radial direction so as to place each locking portion 26 on the shallow groove portion 32 of the corresponding locking groove 31. Then, the second division piece 21b can be prevented from interfering with a boundary 12c between the raceway 12a and the shoulder portion 12b of the outer ring 12.

In the present embodiment, as is the case with the first embodiment, the height of the locking portion 26 and the like may be set such that the relation expressed by Expression (5) is satisfied by the maximum radial deformation ΔA at the position A and the maximum radial deformation ΔB at the position B.

The invention is not limited to the above-described embodiments. The design of the invention can be varied within the scope of the invention recited in the claims. For example, in the above-described embodiments, the protruding portions 24 and the locking grooves 31 are formed in both of the division pieces 21a, 21b. However, the protruding portions 24 may be exclusively formed on one of the division pieces 21a, 21b, and the locking grooves 31 may be exclusively formed in the other of the division pieces 21a, 21b. In each of the division pieces 21a, 21b, one of the protruding portion 24 and the locking groove 31 may be exclusively formed in each of the division cage bars 22a, 22b.

In the above-described embodiments, the locked recessed portion in which the protruding portion 24 is locked is the locking groove 31 that is open at the axially opposite ends of each of the division pieces 21a, 21b. However, the locked recessed portion may be simply recessed. The locking portion 26 of the protruding portion 24 may be exclusively inserted into the locked recessed portion.

The avoiding recessed portion may be partially formed exclusively at a position where the avoiding recessed portion faces the boundary 11c, 12c of the inner ring 11 or the outer ring 12. The inner peripheral surface 24a at the tip portion of the protruding portion 24 may protrude in the radial direction so as to be flush with the protruding area 42. The division pieces 21a, 21b need not necessarily be formed to have the same shape (to be the same components). For example, the cage bars 16 of the cage 14 may be formed exclusively in the first division piece, and the second division piece may be configured by exclusively using the circular ring portion 15.

In the description of the embodiments, the rolling elements 13 are balls. However, the rolling elements 13 may be rollers. That is, the rolling bearing 10 may be a roller bearing. The rolling bearing 10 may be of another type in which the cage 14 has the two division pieces 21a, 21b.

The rolling bearing in the invention allows prevention of interference with a bearing ring when a two-piece cage is assembled.

What is claimed is:

1. A rolling bearing comprising:
a pair of bearing rings arranged so as to face each other in a radial direction;
a plurality of rolling elements interposed between the bearing rings; and
a cage having a pair of circular ring portions and a plurality of cage bars connecting the circular ring portions together, the cage having pockets each formed between the circular ring portions and between the cage bars adjacent to each other in a circumferential direction so as to house the corresponding rolling element, wherein
the cage is formed by coupling a first division piece and a second division piece into which the cage is divided in an axial direction, the first division piece and the second division piece are formed to be identical,
the first division piece is provided with a protruding portion extending in the axial direction of the rolling bearing toward the second division piece and having a locking portion formed at a tip of the protruding portion with the locking portion protruding toward one of a radially inner side and a radially outer side,
the second division piece is provided with a locked recessed portion in which the locking portion is locked, and
on a peripheral surface of the first division piece that is located on the other of the radially inner side and the radially outer side, an avoiding recessed portion is formed which allows avoidance of interference of the peripheral surface of the first division piece with the bearing ring arranged on the other of the radially inner side and the radially outer side when the first division piece is tilted toward the other of the radially inner side and the radially outer side in order to lock the locking portion in the locked recessed portion.

2. The rolling bearing according to claim 1, wherein the peripheral surface of the first division piece is located on the other of the radially inner side and the radially outer side includes a protruding area located on an axially outer side of at least the circular ring portion side of the first division piece and protruding in the radial direction, and a recessed area defined and arranged axially inward of the protruding area via a step portion and recessed in the radial direction with respect to the protruding area, and the recessed area forms the avoiding recessed portion.

3. The rolling bearing according to claim 2, wherein:
a difference between a radius of the recessed area of the first division piece and a radius of the protruding area of the first division piece is denoted as δ,
a diameter of the recessed area is larger than a diameter of the protruding area,
a maximum amount of radial change in a first portion of the first division piece in which the protruding area lies closest to the bearing ring when the first division piece is tilted is denoted as ΔA, and a maximum amount of radial change in a second portion of the first division piece in which the recessed area lies closest to the bearing ring when the first division piece is tilted is denoted as ΔB, a following relation is satisfied:

$$\delta > \Delta B - \Delta A.$$

4. The rolling bearing according to claim 2, wherein the first division piece and the second division piece each include a division cage bar, a protruding portion is provided on a side of each division cage bar, and a peripheral surface of the protruding portion of one of the first division piece and the second division piece and a peripheral surface of the division cage bar of the other division piece form a part of a peripheral surface of the cage where the protruding area and the recessed area are provided.

* * * * *